3,263,986
SHOCK ABSORBER
Raymond P. Tollar, South Bend, Ind., assignor to The Bendix Corporation, South Bend, Ind., a corporation of Delaware
Filed Mar. 2, 1964, Ser. No. 348,377
2 Claims. (Cl. 267—64)

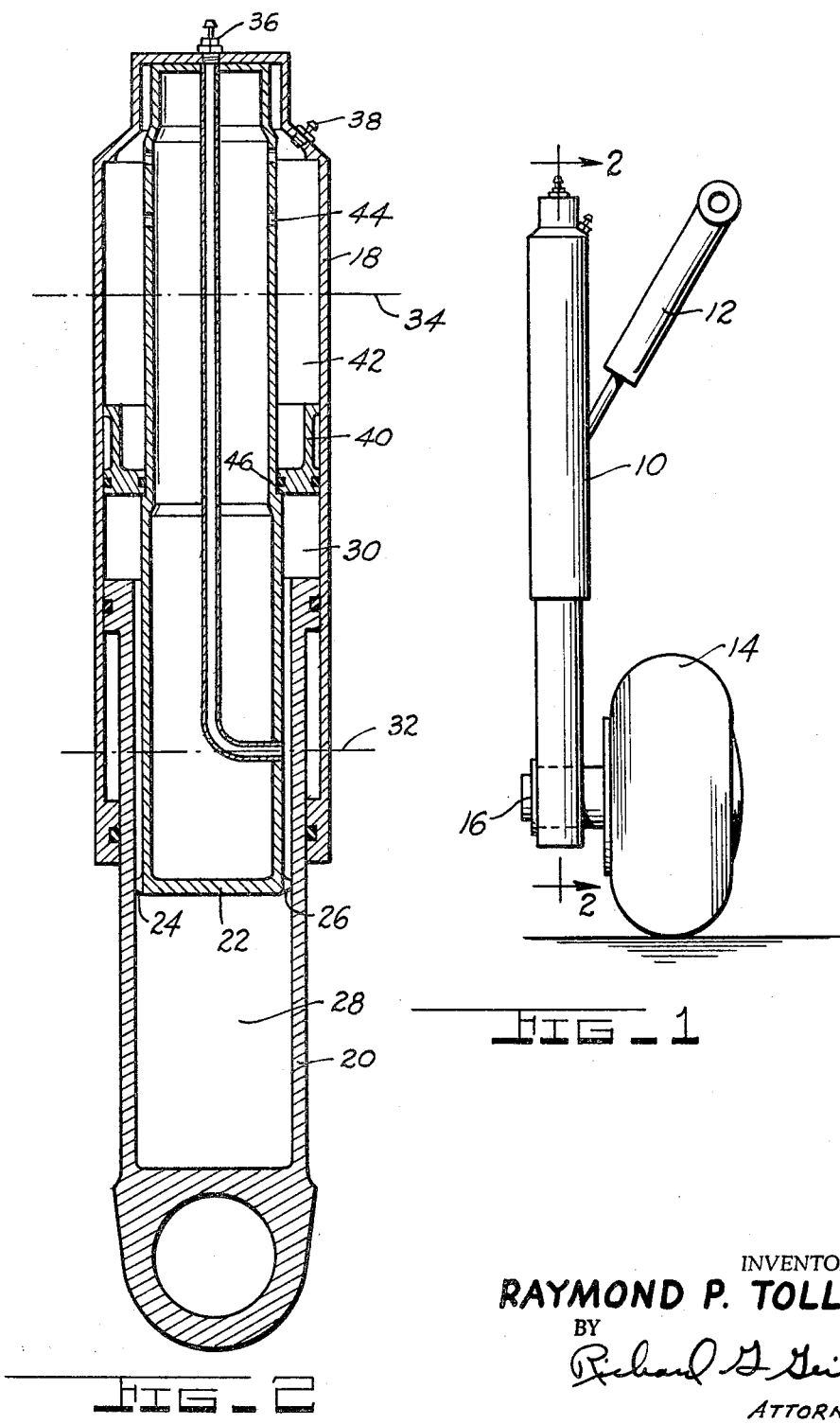

This invention relates to a shock absorber means for conditions encountered in rough field operations.

It is a principal object of this invention to achieve a low air-spring rate in an air/oil shock strut during the taxi range of shock strut stroke.

It is a more particular purpose of this invention to provide a shock strut that operates normally during the first portion of the stroke, using only a primary air chamber, to reach static position in a relatively short period of stroke, thus allowing adequate stroke for rough field operations with a secondary air chamber that comes into operation thereafter to provide the low air-spring rate during the intermediate stroke range, which is selected by load/stroke requirements.

It a still further object of my invention to provide a shock absorber with a primary and secondary air chamber whereby the primary chamber is reduced in volume a predetermined amount with the secondary chamber taking over thereafter until pressure has increased therein to allow the continuance of volume reduction of the primary air chamber.

Still another object of my invention is to provide a shock absorber with a telescoping member having an air chamber above a fluid medium which is divided into two parts by a floating piston.

Other objects and advantages of my invention will appear from the description of the following drawings in which:

FIGURE 1 shows a typical installation for my shock absorber; and

FIGURE 2 shows a cross-sectional view of a shock absorber in accordance with the principles of my invention.

In more detail, as to FIGURE 1, I have shown a shock absorber 10 that is adapted to be retracted by a hydraulic motor 12 and which mounts a wheel 14 on an axle 16. It is to be understood that the shock absorber 10 will be rigidly mounted at its upper end opposite that of the wheel to a surrounding structure as by bolting, etc. (not shown).

The details of my shock absorber are shown in FIGURE 2 wherein I have provided an outer cylinder 18 slidably receiving an inner cylinder 20 that is guided by a central tube 22 having a lower ring 24 slidably associated with the inner walls of the inner cylinder 20. As seen, the ring 24 is appropriately drilled as at 26 radially therearound to provide a plurality of orifices for the conduction of fluid from a lower chamber 28 to an upper chamber 30 as the inner cylinder is being telescoped into the outer cylinder 18.

As shown by the dot and dash lines 32 and 34 the oil level in the normal extended position and the compressed position, respectively, is indicated thereby. The chamber 30 is provided with a floating annular piston 40 to provide a chamber 42 above the chamber 30. As seen compressed air may be introduced by fittings 36 and 38 to the chambers 30 and 42, respectively. Furthermore, I have provided a central tube leading from the fitting 36 to introduce the air to chamber 30, and also there are provided openings 44 in the upper portion of the central tube to permit the compressed air communicated to chamber 42 by fitting 38 to enter the interior of the central tubular member.

In operation the shock strut functions normally during the first portion of the stroke whereby cylinder 20 collapses inwardly of the cylinder 18 dissipating loads by the conduction of fluid through the orifices 26 compressing the primary air chamber 30, to reach a static position in a relatively short portion of the permissible stroke. This allows adequate stroke for rough field taxi operations, such as may be encountered by an airplane. However, as the primary air chamber 30 is reduced in volume to increase the pressure to a predetermined amount, the secondary air chamber 42 then comes into operation to provide a low air-spring rate during an intermediate stroke range, which is selected by load/stroke requirements. When the pressure in the chamber 42 has built up to a sufficient amount to collapse cylinder 20 inwardly so that floating piston 40 is mechanically restrained, which will occur at the end of the aforementioned intermediate stroke range, the shock strut returns to normal operation using only the primary air chamber for the remainder of the stroke.

Thus we have calculated that for a shock absorber having an air volume in the primary chamber 30 of 234.7 cubic inches in the extended position with an air pressure of 672 p.s.i.g. and with the secondary air chamber 42 having an extended air volume of 1,234.75 cubic inches with an air pressure in such extended position of 1,667 p.s.i.g. that upon the load reaching something in the neighborhood of 20,000 lbs. the shock absorber will start stroking until a load of 41,000 lbs. is experienced at approximately 4½" of stroke to start movement of the floating piston 40. When the load reaches approximately 47,000 lbs. the shock absorber aforementioned will be stroked 5" and the floating piston is now in full movement to compress the secondary air chamber 42. As aforementioned the air volume of the shock absorber in the static condition is approximately 107.5 cubic inches and a pressure is developed in accordance with the original charge of approximately 1,450 p.s.i.g.; whereas the air volume of 5" stroke has decreased to 93.7 cubic inches and the pressure has reached 1,667 p.s.i.g. to equal the pressure of the extended air volume in the secondary air chamber 42.

Assuming a permissible stroke of 20" the secondary air chamber will be fully compressed at approximately 19.30" of stroke to have an air volume of 859.45 cubic inches with an internal compressed pressure of 2,402 p.s.i.g., and it will take approximately 67,900 lbs. of force to fully compress the secondary air chamber over this stroke range. Thereafter, the load stroke curve rises sharply in that the floating piston 40 becomes mechanically restrained against further movement and the acting air volume is greatly reduced. During the increase of pressure in the secondary chamber 42 it was acting on a smaller diameter than the pressure in the primary air chamber 30 of the piston 40 due to the stepped construction of the inner or central tube 22 as at 46 which provides a greater area subjected to primary air pressure than that subjected to secondary air pressure when the piston 40 is removed from the stepped portion or stop 46, and this occurs when the volume of the primary air chamber has been reduced to approximately 64.6 cubic inches to develop an air pressure therein of 2,402 p.s.i.g. Thus it should be appreciated that the primary and secondary air chambers are conjunctively compressed but at a disproportionate rate to keep pressures equal on either side of piston 40. My shock strut is fully collapsed when the primary air chamber reaches an air volume of 44.65 cubic inches and the primary air pressure chamber is at 3,467 p.s.i.g. providing a load absorption for 98,000 lbs. and a full 20" stroke.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:
1. In a shock absorber having telescoping portions with provisions for a metering fluid to dissipate energy, a means to provide said shock absorber with a high and low energy air-spring rate comprising:

an inner cylinder having inner and outer walls;
an outer cylinder supporting said inner cylinder and permitting said inner cylinder to telescope therewithin with provisions to affix said outer cylinder to surrounding vehicular structures;
a central tubular member slidably engaging the inner walls of said inner cylinder, said tubular member having a peripheral flange in sliding engagement with said inner walls, which flange separates a first variable volume chamber from a second variable volume chamber in said inner and outer cylinders, said inner tubular member also having means to meter a passage of hydraulic fluid between said first variable volume chamber and said second variable volume chamber as said inner and outer cylinders telescope, said central tubular member further having drilled openings at an end thereof opposite that containing the peripheral flange to provide communication of the interior of said central tubular member with said second variable volume chamber, said central tubular members still further having a stepped construction such that said tubular member has a lesser diameter adjacent said openings and a greater diameter below said opening towards said peripheral flange; and
a pressure responsive means in said second variable volume chamber culling out a third variable volume chamber from said second variable volume chamber which pressure responsive means normally rests on a shoulder created by the stepped construction of said central tubular member to provide a differential effective area of said pressure responsive means on one side as respects the other side thereof;
a means to introduce a hydraulic fluid and a first pneumatic pressure to said second variable volume chamber with the hydraulic fluid flowing through said means to meter fluid into said first variable volume chamber; and
a further means to introduce a second pneumatic pressure of greater magnitude than said first pneumatic pressure to said third variable volume chamber behind said pressure responsive means to maintain said pressure responsive means abutting the shoulder of said central tubular member between the lesser and greater diameters thereof during the normal rest position for said shock absorber.

2. A shock absorber comprising:
an inner cylinder having inner and outer walls;
an outer cylinder reciprocably supporting said inner cylinder to permit telescoping of said inner cylinder into said outer cylinder;
a central tubular member slidably engaging the inner walls of said inner cylinder, said central tubular member having a peripheral flange in sliding engagement with said inner walls, which flange separates a first variable volume chamber from a second variable volume chamber in said inner and outer cylinders, said central tubular member having means cooperating with said inner cylinder to meter a hydraulic fluid passage from said first variable volume chamber to said second variable volume chamber as said inner and outer cylinders telescope, said central tubular member also having drilled openings at an end opposite that of the peripheral flange to provide communication of the interior of said central tubular member with the second variable volume chamber, said central tubular member still further having a stepped construction such that said tubular member has a lesser diameter adjacent said openings and a greater diameter below said openings toward said peripheral flange;
a floating piston operatively connected to the lesser diameter portion of said central tubular member and normally resting on a shoulder between the lesser and greater diameters of said central tubular member to provide an effective area on one side of said piston substantially less than an effective area on the other side of said piston when said piston is abutting the shoulder, which floating piston culls a third variable volume chamber from said second variable volume chamber;
a means to introduce a first pneumatic pressure to said second variable volume chamber; and
a further means for introducing a second pneumatic pressure to said third variable volume chamber of greater magnitude than said first variable volume pressure and of greater volume than said first pneumatic pressure due to the openings in said central tubular member which permit communication of said interior of said central tubular member to said second pneumatic pressure only.

References Cited by the Examiner

UNITED STATES PATENTS

| 2,197,474 | 4/1940 | Johnson | 267—64 |
| 2,222,845 | 11/1940 | Johnson | 267—64 |
| 2,563,518 | 8/1951 | Dickerman | 267—64 |
| 2,724,590 | 11/1955 | Irwin | 267—64 |
| 2,959,410 | 11/1960 | Fullam et al. | 267—64 |
| 3,056,598 | 10/1962 | Conway et al. | 267—64 |
| 3,083,000 | 3/1963 | Perdue | 267—64 |
| 3,140,084 | 7/1964 | Schmidt | 267—64 |

FOREIGN PATENTS

| 648,931 | 1/1951 | Great Britain. |

ARTHUR L. LA POINT, *Primary Examiner.*
H. R. FIELD, R. M. WOHLFARTH,
*Assistant Examiners.*